United States Patent
Ha et al.

(10) Patent No.: US 11,229,312 B2
(45) Date of Patent: Jan. 25, 2022

(54) DISCHARGING DEVICE, BREWING DEVICE COMPRISING THE DISCHARGING DEVICE AND BEVERAGE MAKER

(71) Applicant: Keyway Innovations (Shanghai) Company Limited, Shanghai (CN)

(72) Inventors: Wan Kei Ricky Ha, Shanghai (CN); Nicolas Philippe Roux, Shanghai (CN); Karen Wai Wan, Shanghai (CN)

(73) Assignee: KEYWAY INNOVATIONS (SHANGHAI) COMPANY LIMITED, Shanghai (CN)

( * ) Notice: Subject to any disclaimer, the term of this patent is extended or adjusted under 35 U.S.C. 154(b) by 269 days.

(21) Appl. No.: 16/081,762

(22) PCT Filed: Feb. 21, 2017

(86) PCT No.: PCT/CN2017/074253
§ 371 (c)(1),
(2) Date: Aug. 31, 2018

(87) PCT Pub. No.: WO2017/148303
PCT Pub. Date: Sep. 8, 2017

(65) Prior Publication Data
US 2019/0090681 A1    Mar. 28, 2019

(30) Foreign Application Priority Data

Mar. 1, 2016    (CN) .......................... 201610115311.1

(51) Int. Cl.
*A47J 31/40*    (2006.01)
*A47J 31/053*   (2006.01)
(Continued)

(52) U.S. Cl.
CPC ............. *A47J 31/053* (2013.01); *A47J 31/06* (2013.01); *A47J 31/18* (2013.01); *A47J 31/446* (2013.01); *A47J 31/4407* (2013.01); *A47J 31/46* (2013.01)

(58) Field of Classification Search
CPC ...... A47J 31/04; A47J 31/057; A47J 31/0605; A47J 31/0615; A47J 31/4403;
(Continued)

(56) References Cited

U.S. PATENT DOCUMENTS

| 3,459,118 A | * | 8/1969 | Hausam | ................. | A47J 31/007 99/291 |
| 3,718,084 A | * | 2/1973 | Bufkin | .................. | A47J 31/053 99/312 |

(Continued)

FOREIGN PATENT DOCUMENTS

| CN | 2322489 Y | 6/1999 |
| CN | 1345568 A | 4/2002 |

(Continued)

OTHER PUBLICATIONS

PCT/CN2017/074253 International Search Report.

*Primary Examiner* — Hung D Nguyen
(74) *Attorney, Agent, or Firm* — Maier & Maier, PLLC (57) ABSTRACT

A brewing device includes the discharging device, and a beverage maker. The beverage maker includes a container, a brewing device, and a discharging device positioned in the brewing device. The discharging device includes a vertical pipe assembly and a siphon cover sleeved on the vertical pipe assembly. The vertical pipe assembly penetrates through the bottom of the brewing device and includes a first high-position vertical pipe and a second low-position vertical pipe. The siphon cover includes a first high-position part and a second low-position part. When the siphon cover is sleeved on the vertical pipe assembly, the first high-position
(Continued)

part covers on the first high-position vertical pipe, and the second low-position part covers on the second low-position vertical pipe.

19 Claims, 9 Drawing Sheets

(51) Int. Cl.
*A47J 31/06* (2006.01)
*A47J 31/18* (2006.01)
*A47J 31/44* (2006.01)
*A47J 31/46* (2006.01)

(58) Field of Classification Search
CPC .... A47J 31/4475; A47J 31/467; A47J 31/468; A47J 31/56
USPC ...... 99/280, 281, 282, 289 R, 296, 298, 301
See application file for complete search history.

(56) References Cited

U.S. PATENT DOCUMENTS

| | | | |
|---|---|---|---|
| 4,819,553 A * | 4/1989 | Heyn | A47J 31/465 99/305 |
| 5,799,877 A * | 9/1998 | Gupta | B01D 3/008 239/423 |
| 6,250,208 B1 * | 6/2001 | Helps | A47J 31/0615 99/279 |
| 6,279,460 B1 * | 8/2001 | Pope | A47J 31/0615 426/433 |
| 6,752,070 B1 * | 6/2004 | Lin | A47J 31/06 99/295 |
| 2002/0035929 A1 | 3/2002 | Kanba et al. | |
| 2004/0094472 A1 * | 5/2004 | Brouwer | A47J 31/4496 210/469 |
| 2008/0121110 A1 * | 5/2008 | Lee | A47J 31/56 99/288 |
| 2009/0084271 A1 * | 4/2009 | Njaastad | A47J 31/54 99/323.3 |

FOREIGN PATENT DOCUMENTS

| | | |
|---|---|---|
| CN | 103561617 A | 2/2014 |
| CN | 104093338 A | 10/2014 |
| CN | 104352164 A | 2/2015 |
| FR | 2779928 A1 | 12/1999 |

* cited by examiner

DISCHARGING DEVICE, BREWING DEVICE COMPRISING THE DISCHARGING DEVICE AND BEVERAGE MAKER

TECHNICAL FIELD

The present disclosure relates to a beverage maker, and in particular to a discharging device, a brewing device comprising the discharging device and a beverage maker.

BACKGROUND

In the process of brewing beverages using an automatic beverage maker, it is often necessary to soak brewing ingredients (e.g., tea and herbs) into water. By soaking, the water can expand the brewing ingredients to accelerate the infusion and dissolution of the contents of the ingredients into the water. However, if the ingredients stay in the soaking state for too long, excessive soaking will occur, resulting in over-infusion of ingredients that will change the taste and quality of the beverages. If the brewing device in the beverage maker can properly control the degree of soaking (such as water level) during the brewing process and separate the brewing ingredients and the soaking fluid timely (for example, discharging the soaking water) after the brewing process is finished, this problem can be solved to some extent. That is, the possibility of excessive soaking is reduced. However, the ratio of the fluid outflow rate and the fluid inflow rate in the brewing device has an important effect on the soaking effect. If the outflow rate is higher than the inflow rate, the fluid can hardly accumulate in the brewing device to implement the necessary soaking. On the contrary, if the outflow rate is lower than the inflow rate, the soaking water level in the brewing device will rise depending on the difference between the inflow rate and the outflow rate. If the difference is too small, the soaking water level will rise too slowly, resulting in insufficient soaking. If the difference is too large, too much fluid will overflow from the brewing device, thereby causing a waste of efficiency.

In order to solve these problems, WO2013/098681 describes a siphoning-based system that allows the amount of solvent (e.g., water) inside the brewing device to be kept constant to ensure optimal brewing of the ingredients. However, the brewing device of WO2013/098681 also has problems such as excessive fluid remaining in the brewing device after the brewing has finished, incomplete interruption of siphoning, and the like.

CN104352164A is the applicant's Chinese patent application for invention, which discloses a brewing device comprising a discharging device based on siphoning effect, wherein the discharging device has solved the problems in WO2013/098681 that the siphoning interruption is incomplete and excessive fluid remains in the brewing device after the brewing has finished. Even so, there is room for improvement in the technical solution of CN104352164A. For example, CN104352164A can only maintain a relatively constant single fluid level in the brewing device, and it is difficult to adjust the fluid level for different components/weights of the brewing ingredients to improve the brewing effect.

Therefore, there is a need in the art for a new device to solve the above problems.

SUMMARY

The present disclosure aims to solve the above problems in the prior art. In particular, the present disclosure aims to solve the problems in the prior art that only a relatively constant single fluid level can be maintained in the brewing device, and it is difficult to adjust the fluid level in respect of the composition/ratio of different brewing ingredients and thus improve the brewing effect, etc.

To this end, the present disclosure describes a discharging device for a beverage maker, wherein the beverage maker includes a container and a brewing device housed in the container. The discharging device is positioned inside the brewing device and includes a vertical pipe assembly and a siphon cover sleeved over the vertical pipe assembly. The vertical pipe assembly is positioned at the bottom of the brewing device in a way of penetrating the bottom and include fluid inlets and fluid outlets, wherein the vertical pipe assembly includes a first higher vertical pipe and a second lower vertical pipe, and the siphon cover includes a first higher portion and a second lower portion. When the siphon cover is sleeved over the vertical pipe assembly, the first higher portion covers the first higher vertical pipe, and the second lower portion covers the second lower vertical pipe.

In a preferred embodiment of the above discharging device, a side surface of the first higher portion of the siphon cover has a notch, the height of which is set at the top of the second lower portion, and the siphoning effect will cease when the fluid level drops to said height.

In a preferred embodiment of the above discharging device, the discharging device further includes at least one air intake passage positioned in the siphon cover. When fluid in the brewing device enters the vertical pipe assembly from the fluid inlets and exits the brewing device from the fluid outlets, air can enter the interior of the siphon cover from the air intake passage to eliminate the phenomenon of incomplete interruption of siphoning.

In a preferred embodiment of the above discharging device, the air intake passage includes a first higher air intake passage for the first higher vertical pipe and a second lower air intake passage for the second lower vertical pipe.

In a preferred embodiment of the above discharging device, the first higher air intake passage extends in a vertical direction from a top end of the first higher portion to a top end of the second lower portion, and the second lower air intake passage extends in the vertical direction from the top end of the second lower portion to a bottom end of the second lower portion.

In a preferred embodiment of the above discharging device, the discharging device further includes a filter that is locked to the brewing device above or under and/or alongside the siphon cover and the vertical pipe assembly in an openable or detachable manner, and completely covers the siphon cover and the vertical pipe assembly such that the ingredients inside the brewing device will not enter the discharging device and that the siphon cover will not disengage from the vertical pipe assembly due to daily operations.

In a preferred embodiment of the above discharging device, the discharging device further includes a recessed cavity positioned on an inner bottom surface of the brewing device. The recessed cavity is characterized by having a bottom surface on which the vertical pipe assembly is positioned in a way of penetrating the bottom surface, and a height of a bottom end of the siphon cover is between an inner bottom surface of the brewing device and the bottom surface of the recessed cavity.

In a preferred embodiment of the above discharging device, the bottom end of the siphon cover is provided with a plurality of legs.

According to another aspect of the present disclosure, a brewing device for a beverage maker is provided, the brewing device including the above-described discharging device and at least one overflow hole positioned in the upper portion of the brewing device at a position higher than the discharging device.

According to further another aspect of the present disclosure, a beverage maker is provided, which includes the above-described discharging device or the above-described brewing device.

It can be understood by those skilled in the art that due to a combination of the higher vertical pipe and the lower vertical pipe, as long as the fluid input flow rate of the brewing device is set to be larger than the output flow rate of the lower vertical pipe but smaller than a sum of output flow rates of the high vertical pipe and the low vertical pipe, the present disclosure enables the fluid level in the brewing device to fluctuate between the top end of the higher vertical pipe and the top end of the lower vertical pipe. This ensures sufficient immersion while also achieves a dynamic brewing of the beverage, which is similar to the effect of shaking of the teapot or the coffee maker during manual brewing, and further increases brewing efficiency that is significantly higher than that of the beverage maker in the prior art.

In addition, it will be understood by those skilled in the art that as an extension of the present disclosure, the above-mentioned discharging device may include a combination of more than two vertical pipes and the siphon cover for achieving fluctuation of fluid levels at different heights.

DETAILED DESCRIPTION

The technical solutions of the present disclosure will be described below in conjunction with a tea brewing device and a siphon discharging device for the tea brewing device. However, it will be readily understood by those skilled in the art that the technical solutions of the present disclosure can be obviously applied to other beverage makers, including but not limited to teapots, electric kettles, coffee makers, etc., without changing the basic principle of the present disclosure. Such changes do not depart from the principle of the present disclosure and do not require any inventive work, and therefore will also fall within the scope of protection of the present disclosure.

Figure 1:
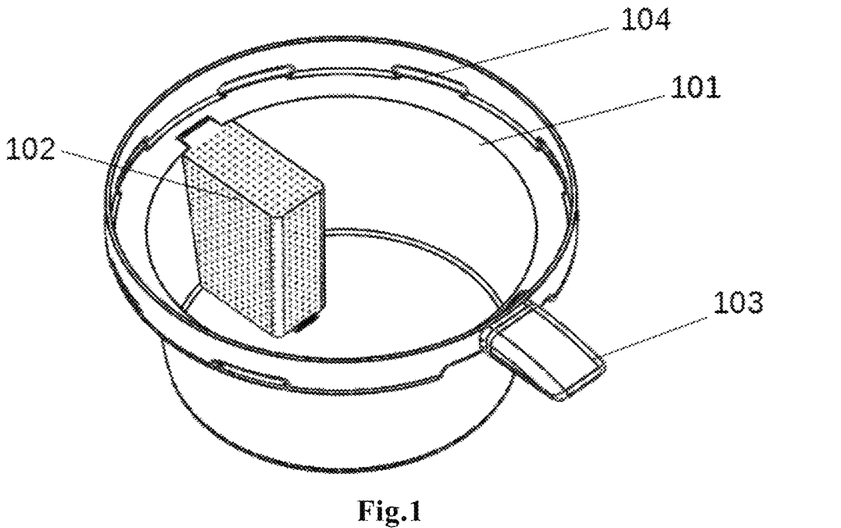
FIG. 1 is a perspective view of a brewing device according to the present disclosure, wherein an assembled discharging device is shown.
Figure 2:
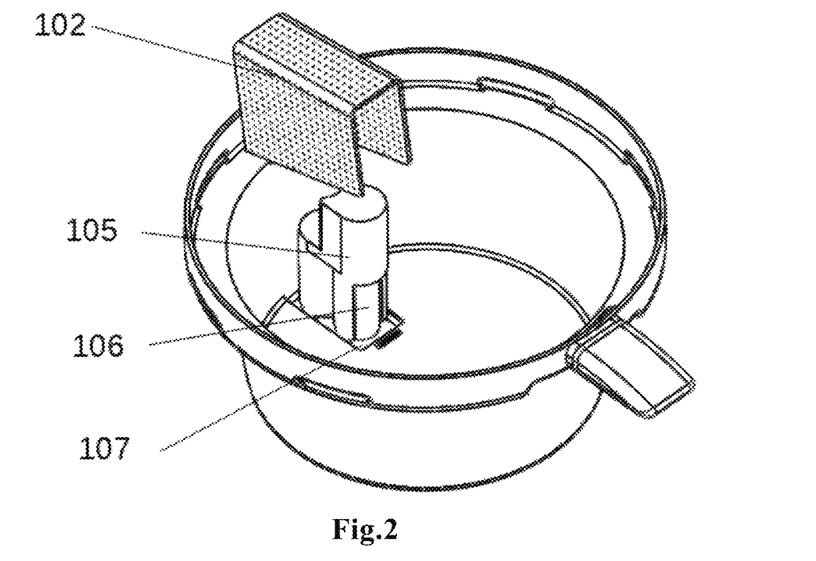
FIG. 2 is a perspective view of the brewing device according to the present disclosure, showing the discharging device in which a filter is opened.
Figure 3:
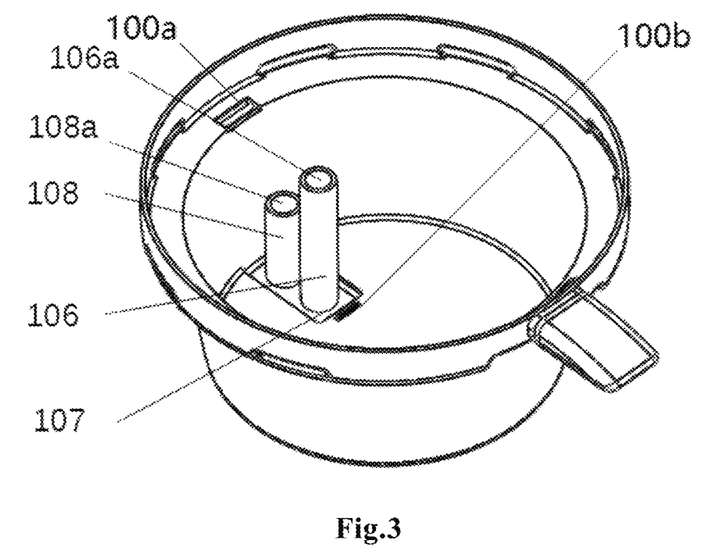
FIG. 3 is a perspective view of the brewing device according to the present disclosure, showing the discharging device in which both the filter and a siphon cover are detached.
Figure 4:
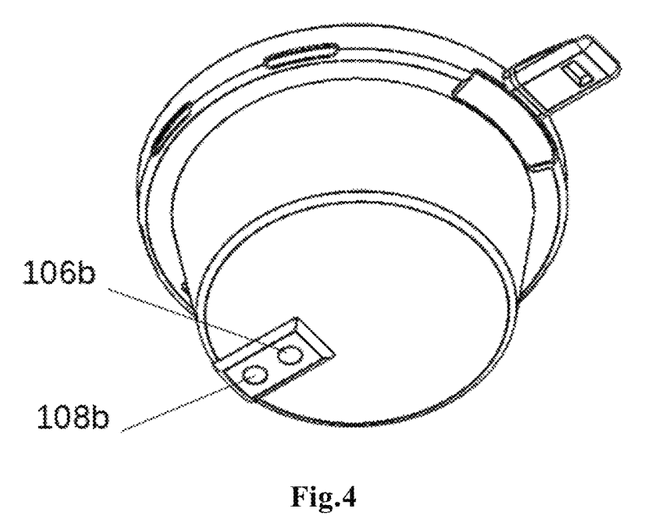
FIG. 4 is a perspective view of the brewing device according to the present disclosure, showing bottom outlets of a vertical pipe assembly of the discharging device.
Figure 5A:
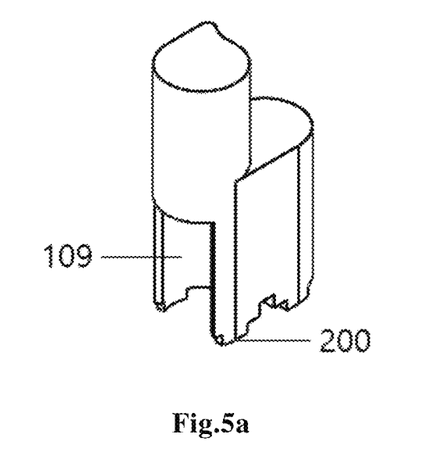
FIGS. 5a-5h are perspective views of the siphon cover according to the present disclosure when viewed from different perspectives.
Figure 5B:
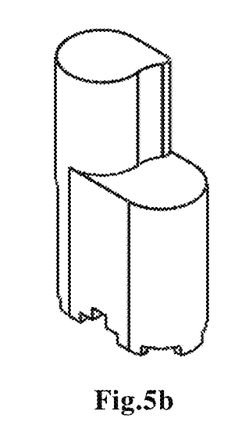
Figure 5C:
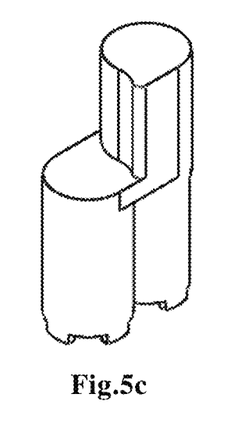
Figure 5D:
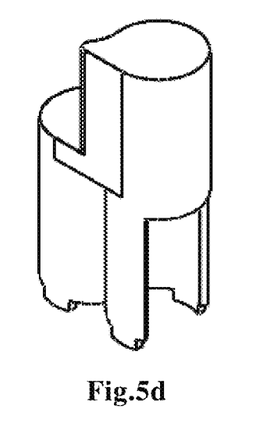
Figure 5E:
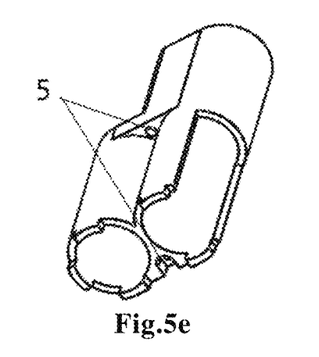
Figure 5F:
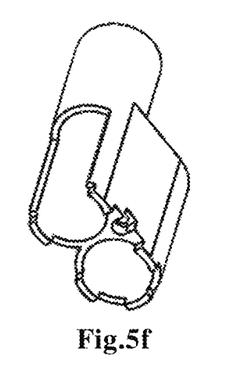
Figure 5G:
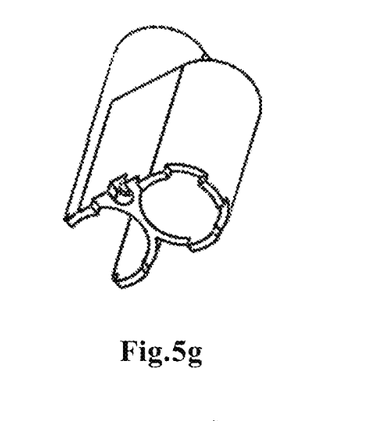
Figure 5H:
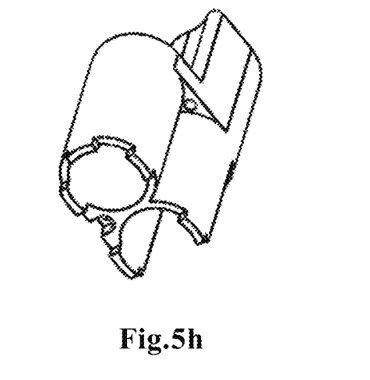

Firstly, referring to FIGS. 1-4, the beverage maker according to the present disclosure includes a container (not shown) and a brewing device 101 housed in the container. A discharging device of the present disclosure is positioned inside the brewing device 101 and includes a vertical pipe assembly 106, 108 and a siphon cover 105 sleeved over the vertical pipe assembly 106, 108. The vertical pipe assembly 106, 108 is positioned at the bottom of the brewing device 101 in a way of penetrating the bottom and includes fluid inlets 106a, 108a and fluid outlets 106b, 108b. Specifically, as shown in FIGS. 3 and 4, the vertical pipe assembly 106, 108 includes a first higher vertical pipe 106 and a second lower vertical pipe 108, wherein the first higher vertical pipe 106 is higher than the second lower vertical pipe 108, and the specific heights thereof can be set by those skilled in the art as required. The first higher vertical pipe 106 and the second lower vertical pipe 108 are positioned at the bottom of the brewing device 101 and penetrate the bottom. Therefore, the fluid inlets 106a, 108a of the first higher vertical pipe 106 and the second lower vertical pipe 108 are located inside the brewing device 101, and the fluid outlets 106b, 108b thereof are located outside the brewing device 101, as shown specifically in FIG. 4.

Figure 6:
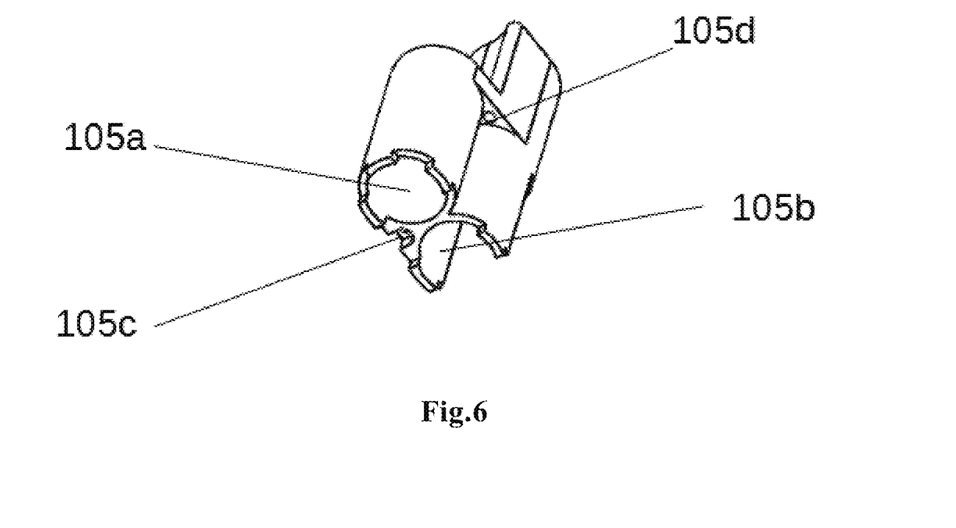
FIG. 6 is a bottom perspective view of the siphon cover according to the present disclosure.

Next, referring to FIGS. 5a-5h and FIG. 6, the siphon cover 105 includes a first higher portion 105b and a second lower portion 105a; when the siphon cover 105 is sleeved over the vertical pipe assembly 106, 108, the first higher portion 105b covers the first higher vertical pipe 106, and the second lower portion 105a cover the second lower vertical pipe 108. A side surface of the first higher portion 105b has a notch 109, the height of which is set approximately at the top of the second lower portion 105a, and the siphoning effect will cease when the fluid level drops to said height. Moreover, the discharging device of the present disclosure further includes at least one air intake passage 5 positioned in the siphon cover 105; when fluid in the brewing device 101 enters the vertical pipe assembly 106, 108 from the fluid inlets 106a, 108a and exits the brewing device 101 from the fluid outlets 106b, 108b, air can enter the interior of the siphon cover 105 from the air intake passage 5 to eliminate the phenomenon of incomplete interruption of siphoning. Specifically, as shown in FIG. 6, the air intake passage 5 includes a first higher air intake passage 105d for the first higher vertical pipe 106 and a second lower air intake passage 105c for the second lower vertical pipe 108. Moreover, the first higher air intake passage 105d extends in a vertical direction from a top end of the first higher portion 105b to a top end of the second lower portion 105a, i.e., it extends to the height of the notch 109 in the side surface of the first higher portion 105b; and the second lower air intake passage 105c extends in the vertical direction from the top end of the second lower portion 105a to a bottom end of the second lower portion 105a, i.e., essentially the same height as the notch 109 on the side surface of the first higher portion 105b. As to how the air intake passages 105d and 105c solve the problem of incomplete interruption of siphoning, reference can be made to the applicant's earlier patent application CN104352164A, the entire disclosure of which is incorporated herein by reference.

Again, with reference to FIGS. 1-3, the discharging device of the present disclosure further includes a filter 102 that is locked to the brewing device 101 above or under and/or alongside the siphon cover 105 and the vertical pipe assembly 106, 108 in an openable or detachable manner by means of locking elements 100a and 100b, and completely covers the siphon cover 105 and the vertical pipe assembly 106, 108 such that the ingredients inside the brewing device 101 will not enter the discharging device and that the siphon cover 105 will not disengage from the vertical pipe assembly 106, 108 due to daily operations (e.g., cleaning). The locking elements 100a and 100b may be in any suitable form such as a hinge, a snap-fit element, or the like, and the positions where they are positioned may also be different from that shown in FIG. 3. As shown in FIG. 1, the brewing device 101 further includes a handle 103 for the operator to grasp so that the brewing device 101 can be manually detached more conveniently.

Next, with reference to FIGS. 2-3 again, the discharging device of the present disclosure further includes a recessed cavity 107 positioned on an inner bottom surface of the brewing device 101, the recessed cavity 107 having a bottom surface on which the vertical pipe assembly 106, 108 is positioned in a way of penetrating the bottom surface. Preferably, a height 201 of a bottom end of the siphon cover 105 is between an inner bottom surface of the brewing device 101 and the bottom surface of the recessed cavity 107. Such an arrangement can solve the problem of excessive fluid remaining in the brewing device after brewing while ensuring normal functioning of the siphoning effect. Preferably, the bottom end of the siphon cover 105 may be provided with a plurality of legs 200 so that when the siphon cover 105 is sleeved over the vertical pipe assembly 106 and 108, the interior and exterior of the siphon cover 105 can be connected.

Figure 7:
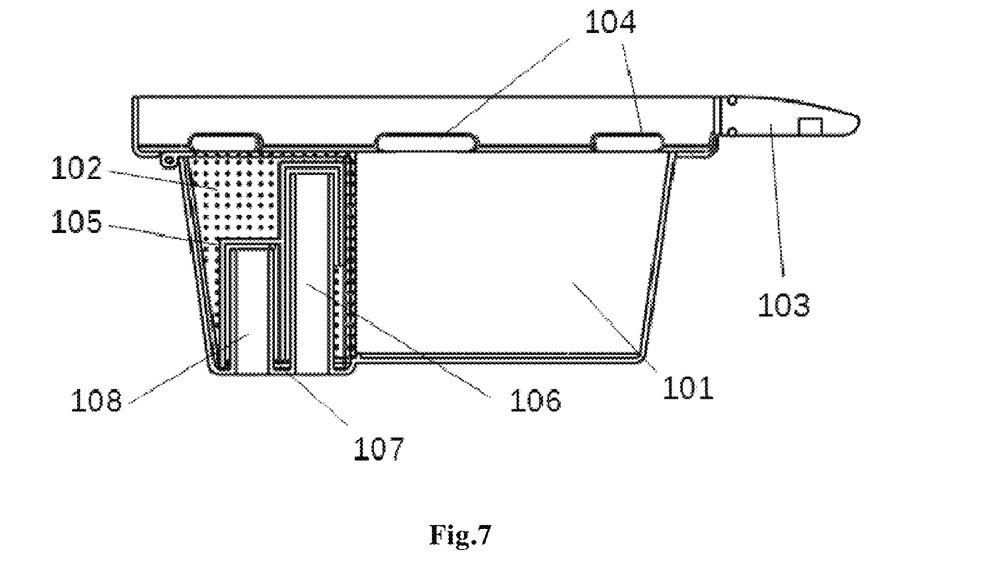
FIG. 7 is a side cross-sectional view of the brewing device according to the present disclosure.
Figure 8:
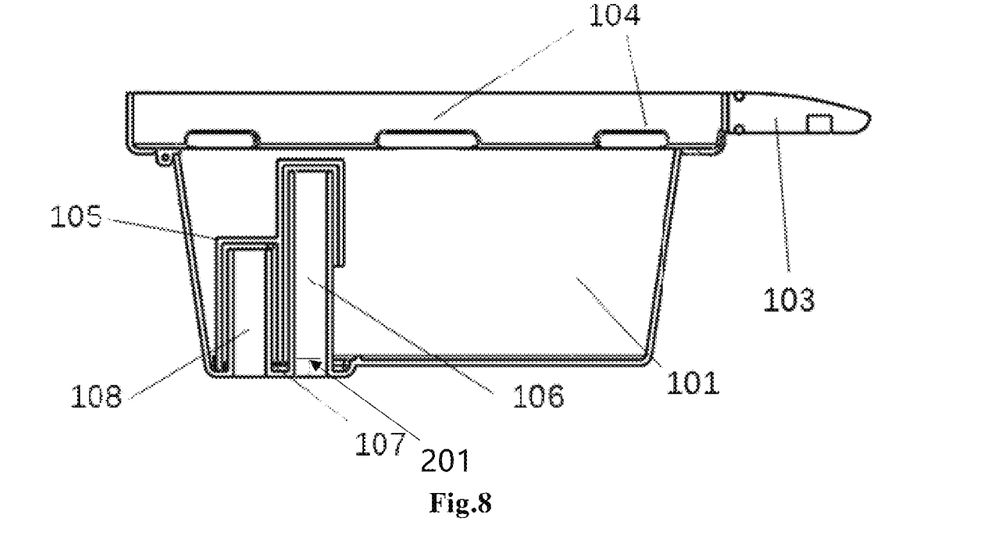
FIG. 8 is a side cross-sectional view of the brewing device according to the present disclosure with the filter detached.

According to another aspect of the present disclosure, a brewing device for a beverage maker is also provided, where the brewing device includes the above-described discharging device. Moreover, as shown in FIGS. 1, 7 and 8, a plurality of overflow holes 104 are positioned in the upper portion of the brewing device 101 at equal intervals in a circumferential direction, and the vertical heights of the overflow holes 104 are higher than the top end of the higher vertical pipe 106 of the discharging device. Further, a beverage maker is also provided according to the present disclosure, which may include the above-described discharging device or the above-described brewing device.

Figure 9A:
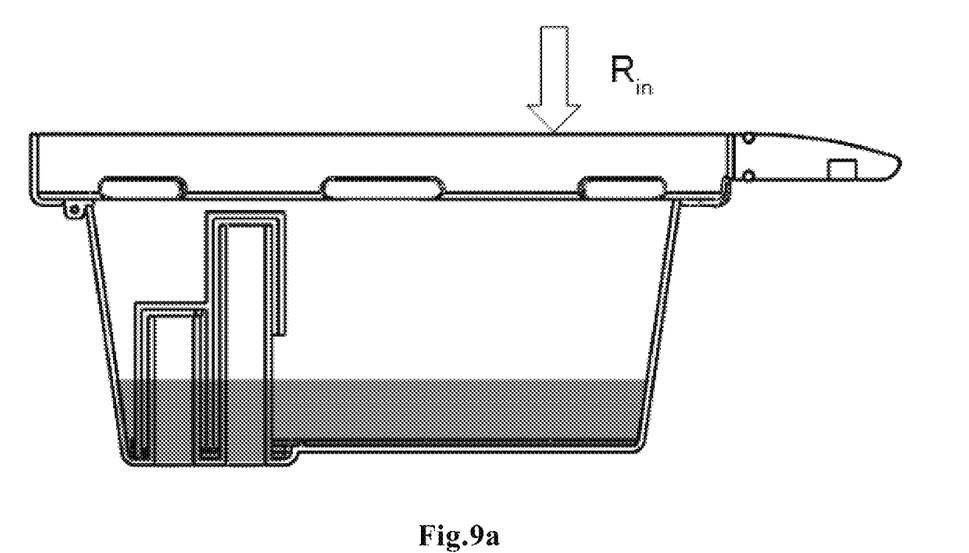
FIGS. 9a-9f are brewing state diagrams of the discharging device according to the present disclosure at different input flow rates and output flow rates.
Figure 9B:
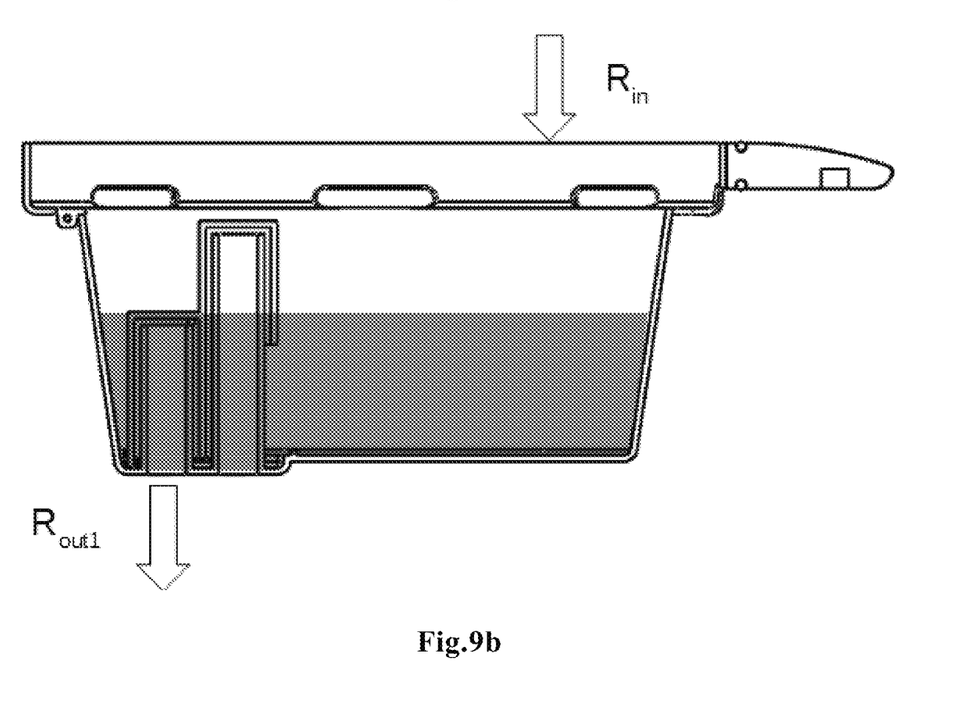

Next, reference is made to FIGS. 9a-9f, which are brewing state diagrams of the discharging device according to the present disclosure at different input flow rates and output flow rates. In FIG. 9a, the fluid flows into the brewing device 101 at an input flow rate $R_{in}$. In FIG. 9b, the fluid level in the brewing device 101 rises to the height of the lower vertical pipe 108, which begins to produce the siphoning effect, and the fluid begins to flow out of the brewing device 101 through the lower vertical pipe 108 at a low-level output flow rate $R_{out1}$. If $R_{in}=R_{out1}$, the amount of input fluid is equal to the amount of output fluid. So the fluid level will be maintained at the height as shown in FIG. 9b, and the soaking effect of using a small amount of brewing ingredients can be achieved as per design requirements.

Figure 9C:
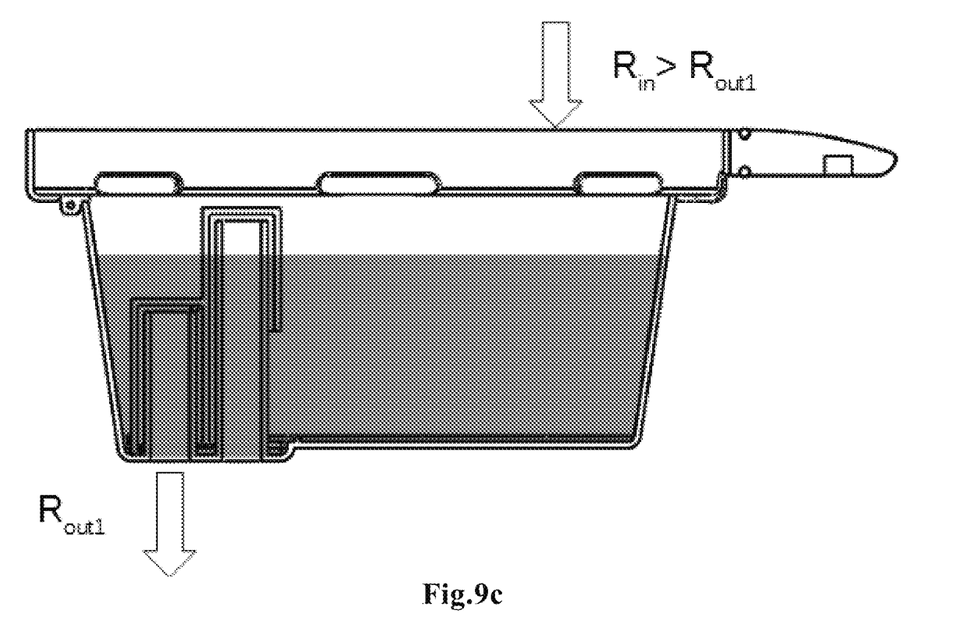
Figure 9D:
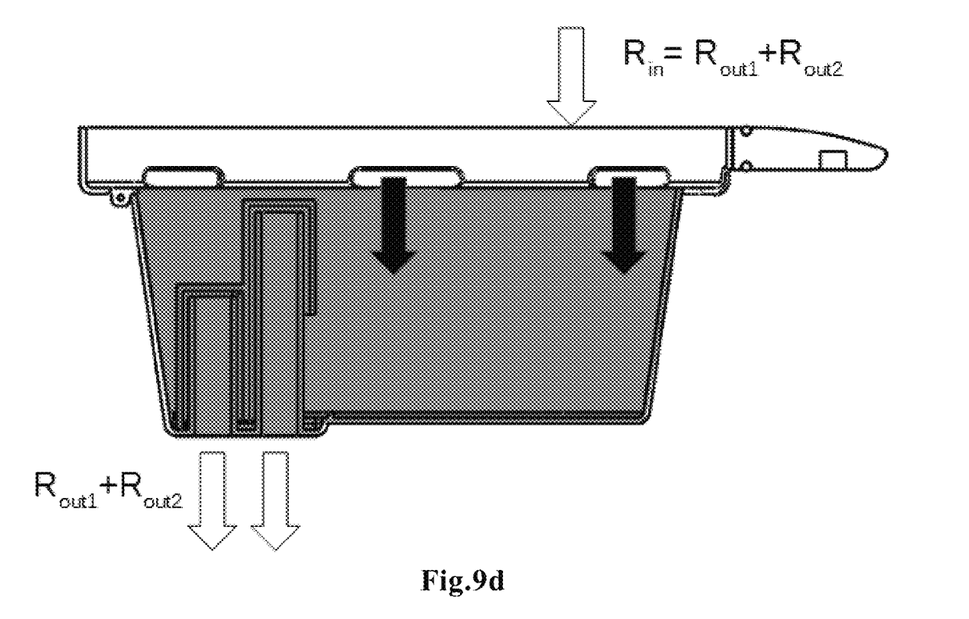
Figure 9E:
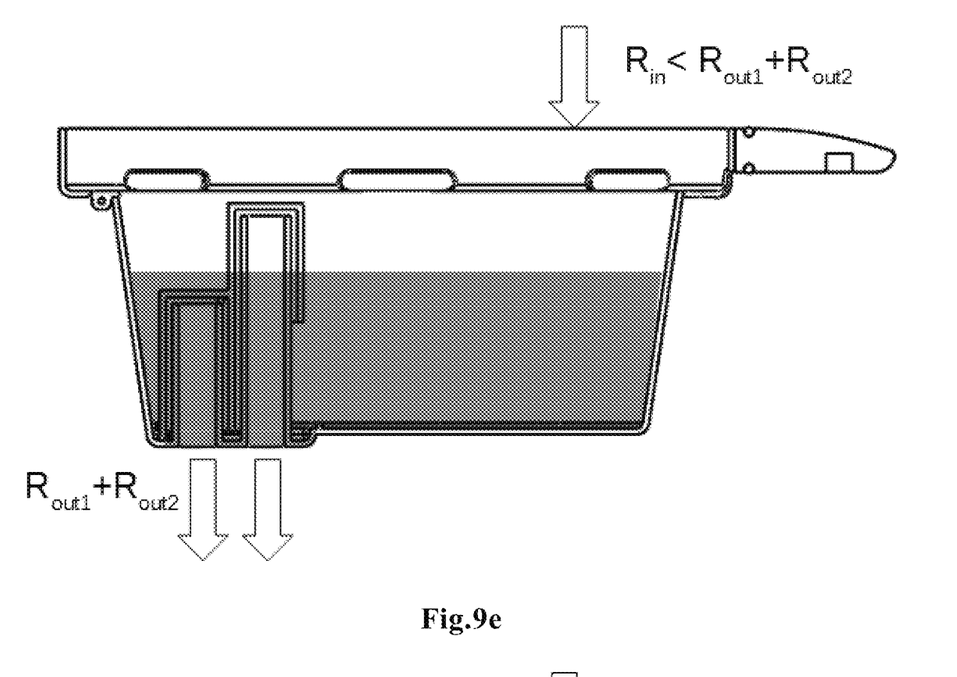

Continued reference is made to FIG. 9c, in which $R_{in}$ is greater than $R_{out1}$. Therefore, as the fluid continues to inflow, the fluid level in the brewing device 101 will continue to rise at a flow rate of $(R_{in}-R_{out1})$. In FIG. 9d, the fluid level in the brewing device 101 rises to the height of the higher vertical pipe 106. As a result, the higher vertical pipe 106 begins to produce a siphoning effect, and the fluid begins to flow out of the brewing device 101 through the lower vertical pipe 108 and the higher vertical pipe 106 at the same time. If $R_{in}$ is equal to $(R_{out1}+R_{out2})$, the fluid level will remain at the height of the higher vertical pipe 106. However, if $R_{in}$ is less than $(R_{out1}+R_{out2})$, the fluid level in the brewing device 101 will begin to decrease at a flow rate of $(R_{out1}+R_{out2}-R_{in})$, as shown specifically in FIG. 9e. Then, when the fluid level in the brewing device 101 drops to the height of the lower vertical pipe 108, the notch 109 on the side surface of the first higher portion 105b and the air intake passage 105d completely interrupt the siphoning effect of the higher vertical pipe 106. At the same time, since $R_{in}$ is larger than $R_{out1}$, the fluid level in the brewing device 101 will rise again until reaching the height of the higher vertical pipe 106 and the high vertical pipe 106 that again produces a siphoning effect. When so repeated, the fluid level in the brewing device 101 will fluctuate between the top end of the lower vertical pipe 108 and the top end of the higher vertical pipe 106, which not only satisfies the soaking requirement of using more brewing ingredients, but also has an effect similar to shaking the container by hand when brewing the beverages manually, so that beverages having the ideal taste can be brewed more quickly.

Figure 9F:
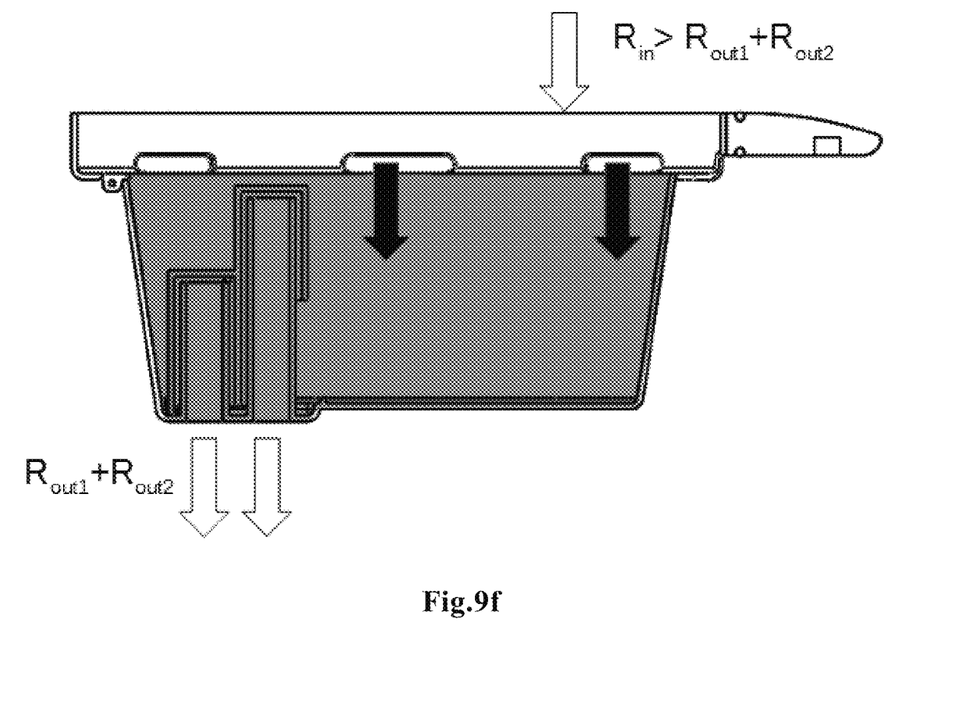

Finally, referring to FIG. 9f, the input flow rate $R_{in}$ of the present disclosure can also be set to be larger than $(R_{out1}+R_{out2})$. In this embodiment, when the fluid level in the brewing device 101 rises to the height of the lower vertical pipe 108 and the lower vertical pipe 108 begins to produce a siphoning effect, the fluid begins to flow out of the brewing device 101 through the lower vertical pipe 108 at the low-level output flow rate $R_{out1}$. Therefore, the fluid level in the brewing device 101 will continue to rise at the flow rate of $(R_{in}-R_{out1})$. Then, when the fluid level in the brewing device 101 rises to the height of the higher vertical pipe 106 and the higher vertical pipe 106 begins to produce a siphoning effect, the fluid begins to flow out of the brewing device 101 through the lower vertical pipe 108 and the higher vertical pipe 106 at the same time at the flow rate of $(R_{out1}+R_{out2})$. Therefore, the fluid level in the brewing device 101 will gradually rise at the flow rate of $(R_{in}-R_{out1}-R_{out2})$. Finally, as shown in FIG. 9f, when the fluid level reaches the height of the overflow holes 104, excessive fluid in the brewing device 101 will flow out of the brewing device 101 from the overflow holes 104, resulting in waste of brewing efficiency. Therefore, in actual design and application, the input flow rate $R_{in}$ should be controlled to be within the range of $R_{out1} \leq R_{in} \leq R_{out1}+R_{out2}$.

Up to this point, the technical solutions of the present disclosure have been described in conjunction with the preferred embodiments shown in the drawings. But it is obvious to those skilled in the art that the scope of protection of the present disclosure is obviously not limited to these specific embodiments. Those skilled in the art can make equivalent changes or replacements to the related technical features without departing from the principle of the present disclosure. The technical solutions after the modification or replacement will fall within the scope of protection of the present disclosure.

What is claimed is:

1. A discharging device for a beverage maker, the beverage maker comprising a container and a brewing device housed in the container, the discharging device being positioned inside the brewing device and comprising a vertical pipe assembly and a siphon cover sleeved over the vertical pipe assembly, the vertical pipe assembly being positioned at the bottom of the brewing device in a way of penetrating the bottom and comprising fluid inlets and fluid outlets, wherein the vertical pipe assembly comprises a first higher vertical pipe and a second lower vertical pipe, and the siphon cover comprises a first higher portion and a second lower portion; when the siphon cover is sleeved over the vertical pipe assembly, the first higher portion covers the first higher vertical pipe, and the second lower portion covers the second lower vertical pipe;

wherein a side surface of the first higher portion of the siphon cover has a notch, the height of which is set at the top of the second lower portion, and the siphoning effect will cease when a fluid level drops to said height.

2. The discharging device according to claim 1, further comprising at least one air intake passage positioned in the siphon cover; when fluid in the brewing device enters the vertical pipe assembly from the fluid inlets and exits the brewing device from the fluid outlets, air can enter the interior of the siphon cover from the air intake passage to eliminate the phenomenon of incomplete interruption of siphoning.

3. The discharging device according to claim 2, further comprising a filter that is locked to the brewing device above or under and/or alongside the siphon cover and the vertical pipe assembly in an openable or detachable manner, and completely covers the siphon cover and the vertical pipe assembly such that ingredients inside the brewing device will not enter the discharging device and that the siphon cover will not disengage from the vertical pipe assembly due to daily operations.

4. The discharging device according to claim 2, further comprising a recessed cavity positioned on an inner bottom surface of the brewing device, the recessed cavity having a bottom surface on which the vertical pipe assembly is positioned in a way of penetrating the bottom surface, and a height of a bottom end of the siphon cover being between an inner bottom surface of the brewing device and the bottom surface of the recessed cavity.

5. The discharging device according to claim 2, wherein the bottom end of the siphon cover is provided with a plurality of legs.

6. The discharging device according to claim 2, wherein the air intake passage comprises a first higher air intake passage for the first higher vertical pipe and a second lower air intake passage for the second lower vertical pipe.

7. The discharging device according to claim 6, further comprising a filter that is locked to the brewing device above or under and/or alongside the siphon cover and the vertical pipe assembly in an openable or detachable manner, and completely covers the siphon cover and the vertical pipe assembly such that ingredients inside the brewing device will not enter the discharging device and that the siphon cover will not disengage from the vertical pipe assembly due to daily operations.

8. The discharging device according to claim 6, further comprising a recessed cavity positioned on an inner bottom surface of the brewing device, the recessed cavity having a bottom surface on which the vertical pipe assembly is positioned in a way of penetrating the bottom surface, and a height of a bottom end of the siphon cover being between an inner bottom surface of the brewing device and the bottom surface of the recessed cavity.

9. The discharging device according to claim 6, wherein the bottom end of the siphon cover is provided with a plurality of legs.

10. The discharging device according to claim 6, wherein the first higher air intake passage extends in a vertical direction from a top end of the first higher portion to a top end of the second lower portion, and the second lower air intake passage extends in the vertical direction from the top end of the second lower portion to a bottom end of the second lower portion.

11. The discharging device according to claim 10, further comprising a filter that is locked to the brewing device above or under and/or alongside the siphon cover and the vertical pipe assembly in an openable or detachable manner, and completely covers the siphon cover and the vertical pipe assembly such that ingredients inside the brewing device will not enter the discharging device and that the siphon cover will not disengage from the vertical pipe assembly due to daily operations.

12. The discharging device according to claim 10, further comprising a recessed cavity positioned on an inner bottom surface of the brewing device, the recessed cavity having a bottom surface on which the vertical pipe assembly is positioned in a way of penetrating the bottom surface, and a height of a bottom end of the siphon cover being between an inner bottom surface of the brewing device and the bottom surface of the recessed cavity.

13. The discharging device according to claim 10, wherein the bottom end of the siphon cover is provided with a plurality of legs.

14. The discharging device according to claim 1, further comprising a filter that is locked to the brewing device above or under and/or alongside the siphon cover and the vertical pipe assembly in an openable or detachable manner, and completely covers the siphon cover and the vertical pipe assembly such that ingredients inside the brewing device will not enter the discharging device and that the siphon cover will not disengage from the vertical pipe assembly due to daily operations.

15. The discharging device according to claim 1, further comprising a recessed cavity positioned on an inner bottom surface of the brewing device, the recessed cavity having a bottom surface on which the vertical pipe assembly is positioned in a way of penetrating the bottom surface, and a height of a bottom end of the siphon cover being between an inner bottom surface of the brewing device and the bottom surface of the recessed cavity.

16. The discharging device according to claim 1, wherein the bottom end of the siphon cover is provided with a plurality of legs.

17. The discharging device according to claim 1, further comprising a filter that is locked to the brewing device above or under and/or alongside the siphon cover and the vertical pipe assembly in an openable or detachable manner, and completely covers the siphon cover and the vertical pipe assembly such that ingredients inside the brewing device will not enter the discharging device and that the siphon cover will not disengage from the vertical pipe assembly due to daily operations.

18. The discharging device according to claim 1, further comprising a recessed cavity positioned on an inner bottom surface of the brewing device, the recessed cavity having a bottom surface on which the vertical pipe assembly is positioned in a way of penetrating the bottom surface, and a height of a bottom end of the siphon cover being between an inner bottom surface of the brewing device and the bottom surface of the recessed cavity.

19. The discharging device according to claim 1, wherein the bottom end of the siphon cover is provided with a plurality of legs.

* * * * *